United States Patent
Chigusa et al.

[11] Patent Number: 6,157,125
[45] Date of Patent: Dec. 5, 2000

[54] CONDUCTIVE ANTI-REFLECTION FILM

[75] Inventors: Hisashi Chigusa, Urawa; Michiyo Abe, Tomioka; Katsuyuki Aoki, Fukaya, all of Japan

[73] Assignee: Kabushiki Kaisha Toshiba, Kawasaki, Japan

[21] Appl. No.: 09/358,560

[22] Filed: Jul. 22, 1999

Related U.S. Application Data

[62] Division of application No. 08/947,104, Oct. 8, 1997, Pat. No. 5,962,966.

[30] Foreign Application Priority Data

Oct. 9, 1996 [JP] Japan .................................. P8-268334

[51] Int. Cl.[7] .................................................. H01J 31/00
[52] U.S. Cl. ...................... 313/480; 313/477 R; 313/364
[58] Field of Search ................................ 313/364, 477 R, 313/479, 480, 313, 466, 473, 35 MS, 478; 174/35 R, 36; 315/85; 220/21 A

[56] References Cited

U.S. PATENT DOCUMENTS

| | | | |
|---|---|---|---|
| 4,641,059 | 2/1987 | Sumiyoshi et al. ................. | 313/477 R |
| 4,663,685 | 5/1987 | Tsang . | |
| 5,099,171 | 3/1992 | Daiku et al. ............................. | 313/479 |
| 5,122,709 | 6/1992 | Kawamura et al. ..................... | 313/479 |
| 5,285,340 | 2/1994 | Ju et al. . | |
| 5,315,469 | 5/1994 | McNeil . | |
| 5,404,073 | 4/1995 | Tong et al. .............................. | 313/479 |
| 5,422,571 | 6/1995 | Gurney et al. . | |
| 5,446,339 | 8/1995 | Kinshita et al. ........................ | 313/478 |
| 5,572,086 | 11/1996 | Tong et al. .............................. | 313/478 |

FOREIGN PATENT DOCUMENTS

| | | |
|---|---|---|
| 55-4727 | 1/1980 | Japan . |
| 61-248212 | 11/1986 | Japan . |
| 2-208812 | 8/1990 | Japan . |
| 3-205607 | 9/1991 | Japan . |
| 3-296907 | 12/1991 | Japan . |

*Primary Examiner*—Nimeshkumar D. Patel
*Assistant Examiner*—Matthew J. Gerike
*Attorney, Agent, or Firm*—Finnegan, Henderson, Farabow, Garrett & Dunner, L.L.P.

[57] ABSTRACT

A second film that contains a substance that secures the conductivity of conductive particles is formed on a first film that contains the conductive particles. The first film and the second film are sintered at the same time. Thus, a conductive anti-reflection film having a sufficiently low surface resistance with a sufficient transmissivity for a high transparency can be obtained with high cost performance. When the conductive anti-reflection film is used for a cathode ray tube, it can almost prevent the AEF (Alternating Electric Field), display a picture in high quality, and be excellent in cost performance.

9 Claims, 3 Drawing Sheets

CONDUCTIVE ANTI-REFLECTION FILM

This is a division of application Ser. No. 08/947,104, now U.S. Pat. No. 5,962,966 filed Oct. 8, 1997. The contents of this application being relied upon and incorporated by reference herein.

BACKGROUND OF THE INVENTION

1. Field of the Invention

The present invention relates to both a conductive anti-reflection film that functions as an anti-reflection film and that prevents an occurrence of an alternating electric field (AEF) and a cathode ray tube therewith formed on the outer surface of a face panel of a face plate.

2. Description of the Related Art

In recent years, it has been pointed out that electromagnetic waves that have generated in the vicinity of an electron gun and a deflection yoke leak out from a cathode ray tube such as a TV Braun tube or a computer monitor and adversely affect an electronic unit or the like that is disposed around the cathode ray tube. To prevent the electromagnetic waves (an electric field) from leaking from the cathode ray tube, it is required to decrease the surface resistance of the face panel thereof. So far, various surface treatment methods for preventing such a face panel from being charged have been proposed as in Japanese Patent Laid-Open Application Nos. Sho 61-118932, Sho 61-118946, and Sho 63-160140. With these methods, the AEF can be prevented.

To prevent the face panel from being charged, the surface resistance of the conductive film can be $1 \times 10^7$ $\Omega/\square$ or more. However, with such surface resistance, the AEF cannot be sufficiently prevented. To prevent the AEF, the surface resistance of the conductive film should be further decreased to $5 \times 10^2$ $\Omega/\square$.

As a method for forming a conductive film with a low surface resistance, a vapor growth method including PVD method, CVD method, and spattering method is known. For example, Japanese Patent Laid-Open Application No. Hei 1-242769 discloses a method for forming a low resistance conductive film by the spattering method. However, with the vapor growth method, large scaled equipment is required to form a conductive film. Thus, the cost of equipment becomes huge. In addition, with the vapor growth method, it is difficult to quantitatively produce such a film.

As a method for forming a conductive film, a solution of which transparent and conductive particles have been dispersed is coated on a substrate. The coated film is dried and sintered. This method is referred to as coating method or wet method. For example, a solution of which particles of tin oxide that contain Sb (referred to as ATO) or tin oxide that contain In (referred to as ITO) and a silica ($SiO_2$) type binder have been mixed and dispersed is coated on a substrate. The resultant coated film is dried and sintered. As a result, a transparent conductive film can be prepared. Since the film thickness of the conductive film prepared in such a manner is designated as ¼ of the designed wave length (namely, ¼ λ), the conductivity of particles of a conductive oxide with a large specific electric resistance is restricted. Thus, with particles of a conductive metal with a small specific electric resistance, the AEF can be effectively prevented.

However, even if a conductive film that contains metal particles is thin, since it absorbs rays in the visible region, when its film thickness increases, the transmissivity of rays particularly in the blue region (a short wavelength region) decreases, thereby degrading the luminance of the resultant cathode ray tube.

In addition, when a low surface resistance equivalent to the specific electric resistance is obtained with a conductive film that contains metal particles, the AEF can be sufficiently prevented without a decrease of the transmissivity of light. However, when the conductive film is formed, since part of metal particles is oxidized or present as metal ions, a sufficiently low surface resistance cannot be obtained.

In other words, it is difficult to reduce the cost of the conductive film that is produced in the dry process such as the spattering method. In addition, with the conductive film that is produced in the conventional coating method, the AEF cannot be effectively prevented without a decrease of the transmissivity of light.

SUMMARY OF THE INVENTION

The present invention is made from the above-described point of view. An object of the present invention is to provide a conductive anti-reflection film that has a surface resistance that can almost prevent an occurrence of the AEF without a decrease of the transmissivity of light.

Another object of the present invention is to provide a cathode ray tube that can prevent an occurrence of the AEF, that displays a picture in high quality, and that can be produced at low cost.

A first aspect of the present invention is a conductive anti-reflection film, comprising a first layer containing conductive particles, and a second layer, disposed on the first layer, for securing the conductivity of the conductive particles.

A second aspect of the present invention is a conductive anti-reflection film, comprising a first layer containing conductive particles, and a second layer disposed on the first layer, the second layer containing a substance that acts as a reducing agent to the conductive particles.

A third aspect of the present invention is a conductive anti-reflection film, comprising a first layer containing conductive particles, and a second layer disposed on the first layer, the second layer containing a substance coordinated to the conductive particles.

A fourth aspect of the present invention is a conductive anti-reflection film, comprising a first layer containing conductive particles and a substance coordinated to the conductive particles, and a second layer disposed on the first layer.

A fifth aspect of the present invention is a cathode ray tube, comprising a face plate having a first surface containing a fluorescent substance, a first layer disposed on a second surface opposite to the first surface of the face plate, the first layer containing conductive particles, and a second layer disposed on the first layer, the second layer containing a substance that secures the conductivity of the conductive particles.

A sixth aspect of the present invention is a cathode ray tube, comprising a face plate having a first surface containing a fluorescent substance, a first layer disposed on a second surface opposite to the first surface of the face plate, the first layer containing conductive particles, and a second layer disposed on the first layer, the second layer containing a substance that acts as a reducing agent to the conductive particles.

A seventh aspect of the present invention is a cathode ray tube, comprising a face plate having a first surface containing a fluorescent substance, a first layer disposed on a second surface opposite to the first surface of the face plate, the first layer containing conductive particles, and a second layer disposed on the first layer, the second layer containing a substance coordinated to the conductive particles.

An eighth aspect of the present invention is a cathode ray tube, comprising a face plate having a first surface containing a fluorescent substance, a first layer disposed on a second surface opposite to the first surface of the face plate, the first plate containing conductive particles and a substance coordinated to the conductive particles, and a second layer disposed on the first layer.

The conductive particles contained in the first layer are composed of at least one substance selected from the group consisting of silver, silver compound, copper, and copper compound. Examples of the silver compound are silver oxide, silver nitrate, silver acetate, silver benzoate, silver bromate, silver bromide, silver carbide, silver chloride, silver chromate, silver citrate, and silver cyclohexanebutyrate. From a view point of which the silver compound is more stably present in the first layer, as a silver alloy, for example Ag—Pd, Ag—Pt, or Ag—Au is preferably used. Examples of the copper compound are copper sulfate, copper nitrate, and copper phthalocyanine. At least one type of particles of such compounds and silver can be selected and used. Assuming that each particle is converted into a sphere with the same volume, the diameter of particles of silver, the diameter of the particles of silver compound, copper, and copper compound is preferably 200 nm or less. When the diameter of particles exceeds 200 nm, the transmissivity of light of the conduction anti-reflection film remarkably degrades. In addition, since the particles cause light to scatter, the conductive anti-reflection film gets dimmed, thereby deteriorating the resolution of the resultant cathode ray tube.

Since the first layer that contains particles of at least one selected from the group consisting of silver, silver compound, copper, and copper compound absorbs rays in the visible range, the transmissivity of light decreases. However, in the first layer, when a low surface resistance equivalent to the specific electric resistance can be obtained, since the film thickness of the first layer can be decreased, the decrease of the transmissivity of light can be suppressed to 30% or less. Likewise, a low resistance that sufficiently prevents an occurrence of the AEF can be accomplished.

In addition, according to the present invention, a substance that secures the conductivity of the conductive particles is not restricted unless the substance causes the conductive anti-reflection film to be corroded and the transmissivity of light to decrease. However, as described above, when the conductive film does not have a sufficiently low surface resistance because part of metal particles is oxidized when the conductive film is formed or because part of metal particles is present as metal ions in the conductive film, as a substance that secures the conductivity of the conductive particles, a substance that acts as a reducing agent to the conductive particles or a substance that is coordinated to the conductive particles is used. Examples of the substance that acts as a reducing agent to the conductive particles are $NaBH_4$, $LiAlH_4$, $LiBH_4$, and $SnCL_2$. These substances can be used simply or as a combination. In particularly, $NaBH_4$ and $LiBH_4$ are preferably used. These substances reduce metal ions and metal oxides contained in the conductive film to metals. Thus, when a layer that contains one of these substances is disposed immediately above the conductive film, the amount of conductive particles with a low specific electric resistance increase in the conductive film. In other words, since the amount of metal that is present as a single substance increases, the conductivity of the conductive film improves. In the layer that contains a substance that acts as a reducing agent to the conductive particles, the content of the substance is preferably 0.1 to 100 mole % to the content of the conductive particles that compose the conductive film. When the content of the substance is 0.1 mole % or less, the substance does not act as a reducing agent to the conductive particles. In contrast, when the content of the substance is 100 mole % or more, since the reductiveness to the conductive particles becomes too strong, the structure of the conductive film is destroyed. Thus, the conductivity of the conductive film degrades.

Examples of the substance that is coordinated to the conductive particles are ethylenediamine-tetraacetic acid (EDTA), acetylacetone, diacetone alcohol, monoethanolamine, diethanolamine, triethanolamine, ammonia water, chelating agent (such as phthalocyanine), β-diketone group, amine group, and phthalocyanine group. Such substances are coordinated to the conductive particles that compose the conductive film, thereby stabilizing the conductive particles as ions. Thus, since the conductive metal or the like is prevented from being oxidized, the resistance of the conductive film can be kept low. Consequently, when such a substance is directly added to the conductive film or when a layer that contains such a substance is disposed immediately above the conductive film, the resistance of the conductive film can be decreased. In other words, the conductivity can be improved. In the conductive film or the layer disposed immediately above the conductive film, the content of the substance coordinated to the conductive particles is preferably 0.1 to 100 mole % to the content of the conductive particles. When the content of the substance that is coordinated to the conductive particles is 0.1 mole % or less to the content of the conductive particles, it is difficult to improve the conductivity of the conductive film. In contrast, when the content of the substance that is coordinated to the conductive particles is 100 mole % or more to the content of the conductive particles, all conductive particles of a conductive metal or a compound thereof become ions. Thus, the conductivity further degrades. A substance that is coordinated to the conductive particles can be used along with a substance that acts as a reducing agent to the conductive particles. In other words, a substance that is coordinated to conductive particles is contained in the conductive film. In addition, a layer that contains a substance that acts as a reducing agent to the conductive particles can be disposed immediately above the conductive film. Moreover, a layer that contains both a substance coordinated to the conductive particles and a substance that acts as a reducing agent to the conductive particles can be disposed immediately above the conductive film.

According to the present invention, the conductive anti-reflection film is composed of a plurality of films. When the conductive anti-reflection film is composed of two layers, the refractive index of the layer disposed immediately above the conductive film should be smaller than the refractive index of the conductive film. At this point, the layer disposed immediately above the conductive layer is preferably a layer mainly composed of $SiO_2$ (silica layer). The silica layer contains the above-described substance coordinated to the conductive particles and/or substance that secures the conductivity of the conductive particles. In addition, according to the present invention, to effectively decrease the reflectance of the conductive anti-reflection film, a third layer that contains for example $SiO_2$ can be disposed on the second layer above the first layer. In other words, the conductive anti-reflection film can be composed of three or more layers. At this point, when the difference of the refractive indexes of the two adjacent layers is decreased, the reflectance of the conductive anti-reflection film can be effective decreased.

According to the present invention, when the conductive anti-reflection film is composed of the first and second layers, the film thickness of the first layer is 200 nm or less and the refractive index thereof is in the range from 1.7 to 3. The film thickness of the second layer is 10 times or less of the film thickness of the first layer. The refractive index is in the range from 1.38 to 170. However, when the third layer is disposed above the second layer, the film thickness and refractive index of each of the first to third layers are properly designated corresponding to the transmissivity of light, the refractive index, and so forth of the entire conductive anti-reflection film. When a silica layer is disposed immediately above the conductive layer that contains the conductive particles, the conductivity of the conductive film can be remarkably improved due to the following reason. In other words, in the conductive film that contains the conductive particles, the particles do not sufficiently contact each other. However, when a film that contains a gel of silica is formed on a film that contains the conductive particles and then these two films are sintered at the same time, in the process of which the film containing the gel of silica becomes dense and thereby a silica layer is formed, the conductive particles contained in the conductive film become dense. Thus, since the conductive particles sufficiently contact each other, high conductivity can be obtained.

The conductive anti-reflection film is composed of a first layer and a second layer in the following manner. First of all, a first film that contains conductive particles of such as silver (and a substance that is coordinated to the conductive particles if necessary) is formed on a substrate such as the outer surface of a face panel. A second film that contains a substance acting as a reducing agent to the conductive particles (and a substance that is coordinated to the conductive particles if necessary) is formed immediately above the first film. The first layer and the second layer are sintered at the same time. When the first film and the second film are sintered at the same time, the conductive particles of the first film equally become tight and dense. Thus, the resultant conductive anti-reflection film has high conductivity. Consequently, the film thicknesses of the first film and the second film should be adjusted so that they equally shrink. When a third film is disposed above a second film on a first film (namely, the conductive anti-reflection film is composed of three or more layers), due to the above-described reason, the film thicknesses of the first to third films should be adjusted so that they equally or almost equally shrink in the conditions of the temperature, pressure, and so forth of the sintering process.

According to the present invention, when a conductive anti-reflection film is formed, a solution of which particles of for example Ag or Cu (and a substance that is coordinated to the conductive particles if necessary) have been dispersed along with a non-ion surface active agent is coated on a substrate of the outer surface of a face panel of a cathode ray tube by the spin coat method, spray method, dipping method, or the like. At this point, to suppress the first film from being unevenly disposed and cause the film thickness thereof to be equal, the temperature of the front surface of the substrate is preferably kept in the range from 5 to 60° C. The first film is controlled so that the film thickness thereof is in the range from 25 nm to 100 nm. The film thickness of the first film can be easily controlled by adjusting metal particles of such as Ag or Cu contained in the solution, the concentration of the substance that is coordinated to the conductive particles, the rotations of the spin coater (in the coating state), the discharging amount of the dispersion solution in the spray method, or the pulling speed in the dipping method. A solvent of the solution is water. If necessary, as a solvent of the solution, ethanol, IPA, or the like can be contained in water. In addition, an organic metal compound, a pigment, a die, or the like can be contained in the solution so as to allow the resultant first layer to have another function. Thereafter, a second film is formed on the first layer. When the second film is formed, silicate solution that contains a substance that acts as a reducing agent to the conductive particles (and a substance that is coordinated to the conductive particles if necessary) can be coated on the first layer by the spin coat method, spray method, dipping method, or the like. The film thickness of the second film is normally in the range from 100 nm to 2000 nm. The film thickness of the second film can be easily controlled by adjusting for example the density of the silicate solution, the rotations of the spin coater (in the coating state), the discharging amount of the solution in the spray method, or the pulling speed in the dipping method. The resultant first and second films are simultaneously sintered at a temperature of 150 to 450° C. for 10 to 180 minutes. Thus, a conductive anti-reflection film and a cathode ray tube therewith according to the present invention can be obtained.

These and other objects, features and advantages of the present invention will become more apparent in light of the following detailed description of best mode embodiments thereof, as illustrated in the accompanying drawings.

DESCRIPTION OF PREFERRED EMBODIMENTS

Next, embodiments of the present invention will be described in details. It should be noted that the present invention is not limited to the embodiments that follow.

First and Second Embodiments 0.5 grams of particles of a silver compound such as $Ag_2O$, $AgNO_3$, or AgCl was dissolved with 100 grams of water. As a result, a first solution was prepared. 100 grams of silicate solution composed of 8 parts by weight of methyl silicate, 0.03 parts by weight of nitric acid, 500 parts by weight of ethanol, and 15 parts by weight of water was mixed with 0.01 parts by weight of $NaBH_4$ or $LiAlH_4$ as a reducing agent. As a result, a second solution that contains $NaBH_4$ and a third solution that contains $LiAlH_4$ were prepared. Thereafter, the outer surface of the face panel (a 6-inch car-equipped panel) of a cathode ray tube that had been assembled was buffed with cerium oxide so as to remove rubbish, dust, and oil therefrom. Thereafter, the first solution was coated on the outer surface of the face panel and thereby a first coated film was obtained by the spin coat method in the conditions that the surface temperature of the panel (coated surface) was 45° C., the rotations of the spin coater in the solution pouring state was 80 rpm–5 sec, and the rotations of the spin coater in the film forming state was 150 rpm–80 sec. Next, the second solution (as the first embodiment) or the third solution (as the second embodiment) was coated on the first film by the spin coat method in the conditions that the rotations of the spin coater was 80 rpm–5 sec in the solution pouring state and 150 rpm–80 sec in the film forming state. Thereafter, the first and second films were sintered at a temperature of 210° C. for 30 minutes.

Figure 1:
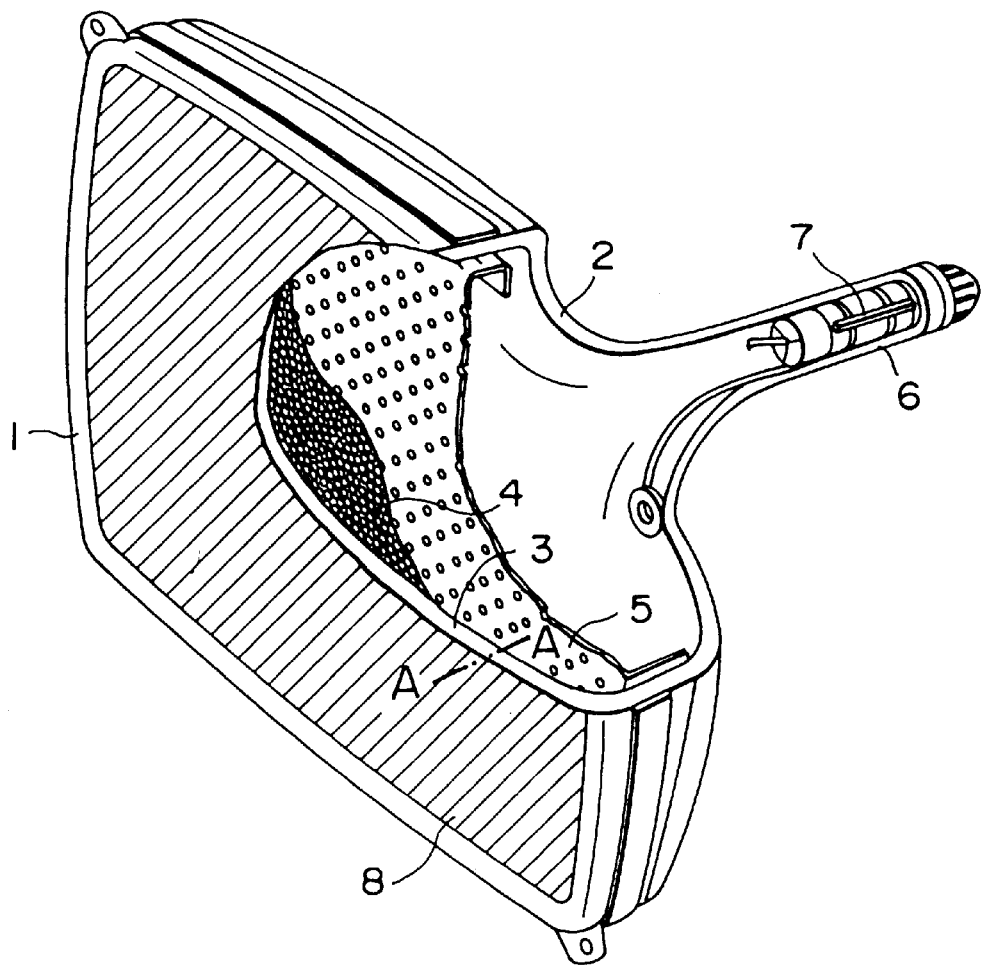
FIG. 1 is a perspective view showing the structure of a cathode ray tube according to an embodiment of the present invention.

FIG. 1 shows a color cathode ray tube that has been produced corresponding to the first embodiment or the second embodiment of the present invention.

Referring to FIG. 1, the color cathode ray tube has a housing composed of a panel 1 and a funnel 2 integrally connected thereto. A fluorescent plane 4 is formed on the inner surface of a face panel 3 disposed on the panel 1. The fluorescent plane 4 is composed of a three-color fluorescent layer and a black light absorbing layer. The three-color fluorescent layer emits blue, green, and red rays. The black light absorbing layer is disposed at space of the three-color fluorescent layer. The three-color fluorescent layer is obtained by coating a slurry of which each fluorescent substance has been dispersed along with PVA, a surface active agent, pure water, and so forth on the inner surface of the face panel 3 corresponding to the conventional method. The three-color fluorescent layer may be formed in a stripe shape or a dot shape. In these examples, the three-color fluorescent layer was formed in the dot shape. A shadow mask 5 that has a large number of electron beam holes is formed opposite to the fluorescent plane 4. An electron gun 7 that radiates an electron beam is disposed on the fluorescent plane 4. The electron beam emitted by the electron gun 7 hits the fluorescent plane 4, thereby exciting the three-color fluorescent layer and emitting three colors of rays. A conductive anti-reflection film 8 is formed on the outer surface of the face panel 3.

Figure 2:
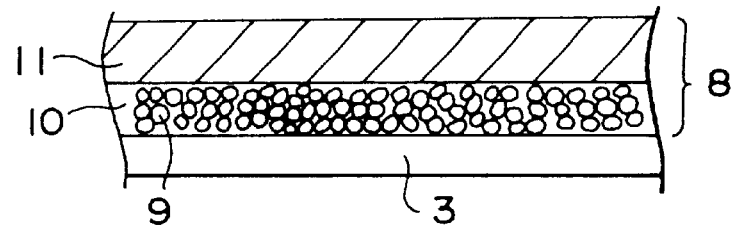
FIG. 2 is a sectional view taken along line A—A' of the cathode ray tube shown in FIG. 1.

FIG. 2 is a sectional view taken along line A—A' of the cathode ray tube shown in FIG. 1. Referring to FIG. 2, the conductive anti-reflection film 8 that has a first layer 10 containing conductive particles 9 of for example silver and a second layer 11 containing $SiO_2$ and a reducing agent is formed on the front surface of the face panel 3.

As a compared example, a silicate solution that does not contain a reducing agent was coated on the first film by the spin coat method in the same manner as the first and second embodiments. Thereafter, the first layer and the second layer were sintered at the same time in the same manner as the first and second embodiments.

Figure 3:
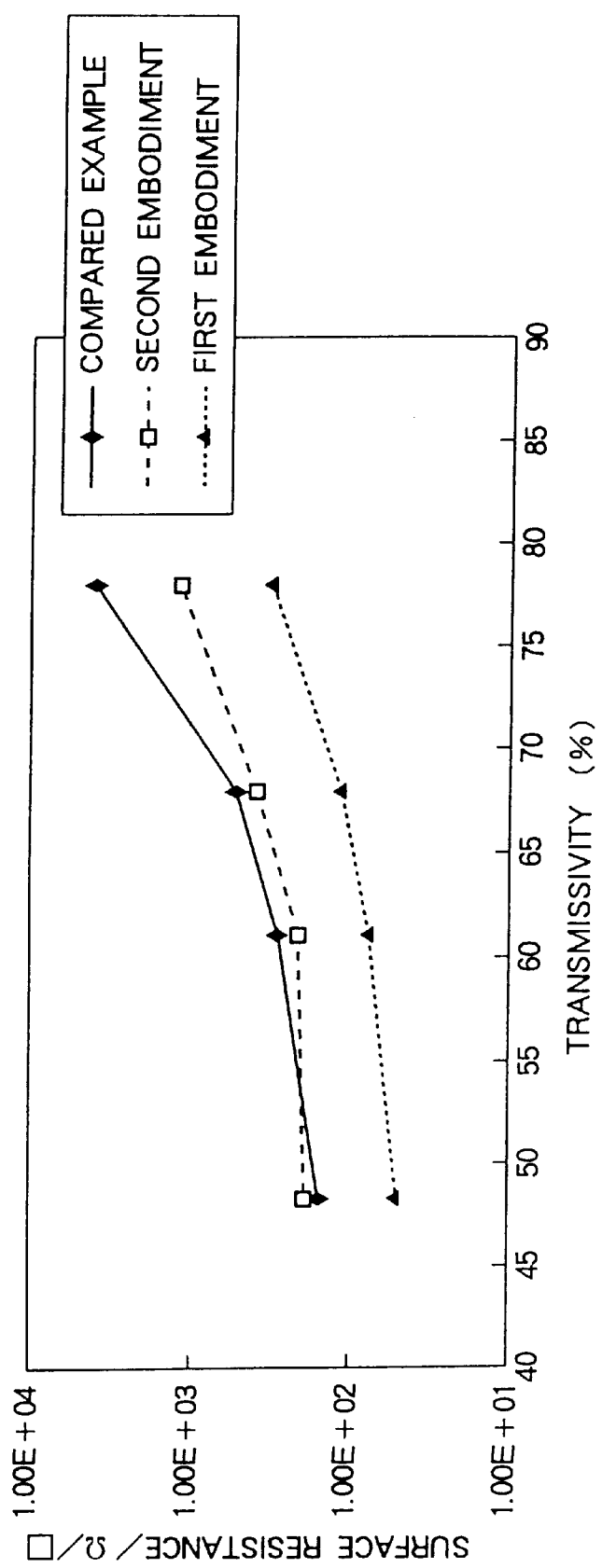
FIG. 3 is a graph showing measured results of transmissivity and surface resistance of conductive anti-reflection films according to a first embodiment, a second embodiment, and a compared example.

Next, the transmissivity and surface resistance of light (white light) were measured for the conductive anti-reflection films of the first embodiment, the second embodiment, and the compared example. The surface resistance was measured with Loresta IP MCP-T250 (made by Yuka Denshi Company). FIG. 3 shows measured results of transmissivity and surface resistance of conductive anti-reflection films according to a first embodiment, a second embodiment, and a compared example.

Referring to FIG. 3, it is clear that the surface resistance of the conductive anti-reflection films of the first and second embodiments is much lower than the surface resistance of the conductive anti-reflection film of the compared example while a sufficient transmissivity for a high transparent is accomplished.

Third and Fourth Embodiments 0.01 to 0.05% by weight of diethanolamine (DEA) or 3% ammonium solution was mixed with 100 grams of silicate solution composed of 8 parts by weight of methyl silicate, 0.03 parts by weight of nitric acid, 500 parts by weight of ethanol, and 15 parts by weight of water. As a result, a fourth solution that contains DEA and a fifth solution that contains ammonium were prepared.

Thereafter, the fourth solution (in the case of the third embodiment) or the fifth solution (in the case of the fourth embodiment) was coated on the first coated film formed on the outer surface of the face panel (6-inch car-equipped panel) of the cathode ray tube that had been assembled as with the first embodiment by the spin coat method. As a result, a second coated film was formed. Next, the first coated film and the second coated film were sintered at a temperature of 210° C. for 30 minutes.

Figure 4:
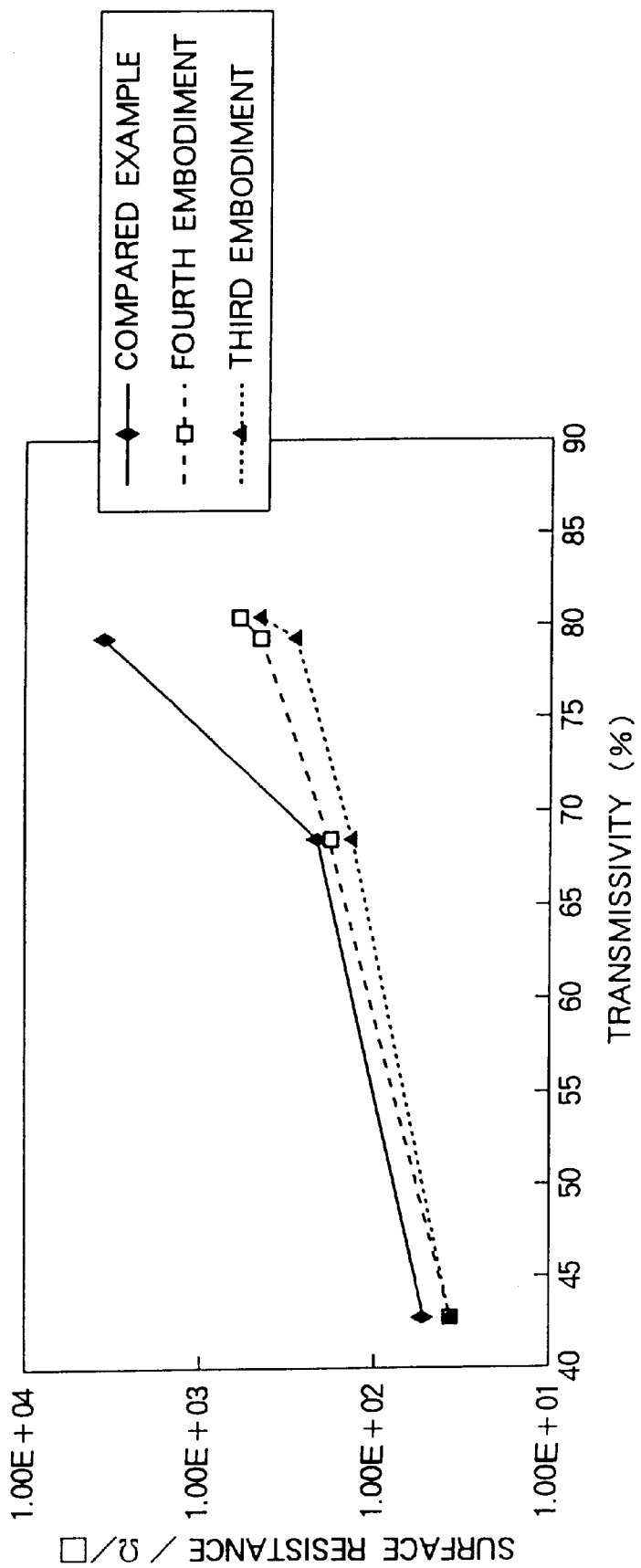
FIG. 4 is a graph showing measured results of transmissivity and surface resistance of conductive anti-reflection films according to a third embodiment, a fourth embodiment, and a compared example.

Thereafter, the transmissivity of light (white light) and surface resistance of the conductive anti-reflection films of the third embodiment and the fourth embodiment were measured in the same manner as the first and second embodiments. FIG. 4 shows the measured results of transmissivity and surface resistance of conductive anti-reflection films according to the third embodiment, the fourth embodiment, and the compared example.

Referring to FIG. 4, it is clear that the surface resistance of the conductive anti-reflection films of the third and fourth embodiment is much lower than the surface resistance of the conductive anti-reflection film of the compared example while a sufficient transmissivity for a high transparency is accomplished.

Thus, with the conductive anti-reflection film according to the present invention, the surface resistance can be remarkably decreased while a sufficient transmissivity for a high transparency is accomplished. Consequently, in a cathode ray tube such as a TV Braun tube or a computer monitor, the AEF can be almost prevented.

In addition, since the conductive anti-reflection film according to the present invention can be produced by the coating method (wet method) that is simple and effective, the conductive anti-reflection film that is excellent in production and cost performance can be provided.

Thus, when the conductive anti-reflection film according to the present invention is used, a cathode ray tube that can almost prevent the AEF and that can display a picture in high quality can be easily provided.

Moreover, since the cathode ray tube according to the present invention has a conductive anti-reflection film that has a very low surface resistance with a sufficient transmissivity for a high transparency, the conductive anti-reflection film can almost prevent the AEF and can display a picture in high quality.

Furthermore, in the cathode ray tube according to the present invention, since the conductive anti-reflection film can be produced by the coating method (wet method) that is simple and effective, the cathode ray tube that is excellent in production and cost performance can be provided.

Thus, the cathode ray tube that can almost prevent the AEF, display a picture in high quality, and be excellent in cost performance can be provided.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A conductive anti-reflection film, comprising:
   a first layer containing conductive particles; and
   a second layer disposed on said first layer, said second layer containing a substance that acts as a reducing agent to the conductive particles.

2. The conductive anti-reflection film as set forth in claim 1, wherein at least one of said first layer and said second layer further contains a substance which is to be coordinated to the conductive particles.

3. The conductive anti-reflection film as set forth in claim 2,
    wherein the substance which is to be coordinated to the conductive particles is at least one substance which is to be selected from the group consisting of ethylenediamine-tetraacetic acid (EDTA), acetylacetone, diacetone alcohol, monoethanolamine, diethanolamine, triethanolamine, ammonia water, phthalocyanine, β-diketone group, amine group, and phthalocyanine group.

4. The conductive anti-reflection film as set forth in claim 1,
    wherein the substance that acts as the reducing agent to the conductive particles is at least one substance selected from the group consisting of $NaBH_4$, $LiAlH_4$, $LiBH_4$, and $SnCl_2$.

5. A conductive anti-reflection film, comprising:
    a first layer containing conductive particles; and
    a second layer disposed on said first layer, said second layer containing a substance which is to be coordinated to the conductive particles.

6. A conductive anti-reflection film, comprising:
    a first layer containing conductive particles and a substance which is to be coordinated to the conductive particles; and
    a second layer disposed on said first layer.

7. The conductive anti-reflection film as set forth in one of claims 1 to 4,
    wherein the conductive particles are formed of at least one substance selected from the group consisting of silver, silver compound, copper, and copper compound.

8. The conductive anti-reflection film as set forth in one of claims 1 to 4,
    wherein the refractive index of said first layer is larger than the refractive index of said second layer.

9. The conductive anti-reflection film as set forth in claim 5 or 6,
    wherein the substance which is to be coordinated to the conductive particles is at least one substance selected from the group consisting of ethylenediamine-tetraacetic acid (EDTA), acetylacetone, diacetone alcohol, monoethanolamine, diethanolamine, triethanolamine, ammonia water, phthalocyanine, β-diketone group, amine group, and phthalocyanine group.

* * * * *

UNITED STATES PATENT AND TRADEMARK OFFICE
CERTIFICATE OF CORRECTION

PATENT NO. : 6,157,125  
DATED : December 5, 2000  
INVENTOR(S) : Chigusa et al.

Page 1 of 1

It is certified that error appears in the above-identified patent and that said Letters Patent is hereby corrected as shown below:

<u>Column 10,</u>  
Line 2, change "claims 1 to 4" to -- claims 1, 5 or 6 --.  
Line 9, change "claims 1 to 4" to -- claims 1, 5 or 6 --.

Signed and Sealed this

Twenty-third Day of April, 2002

Attest:

JAMES E. ROGAN  
*Director of the United States Patent and Trademark Office*

*Attesting Officer*